Oct. 30, 1923.
H. QUINBY
1,472,136
TRACTOR
Filed May 3, 1922
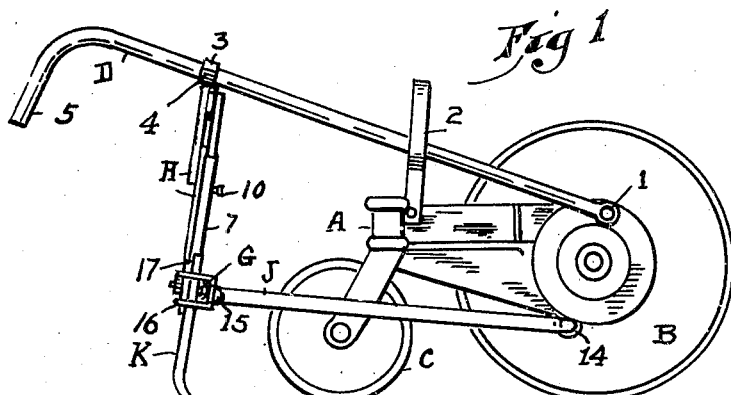
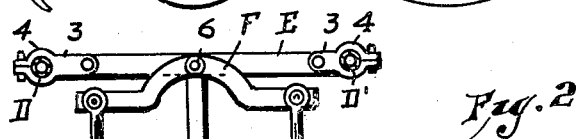
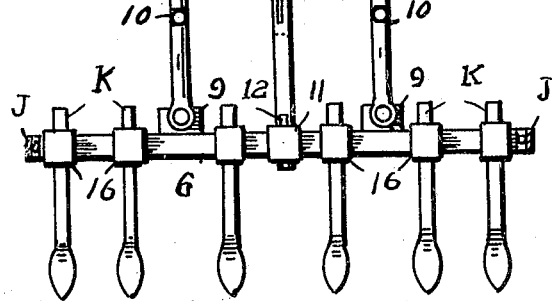
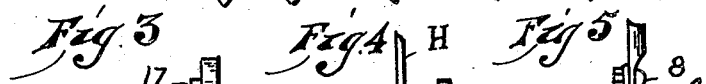
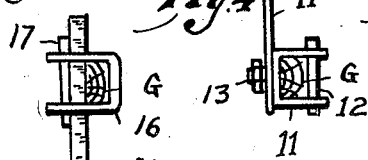
WITNESS
INVENTOR.
Harrison Quinby.
BY
ATTORNEYS.

Patented Oct. 30, 1923.

1,472,136

UNITED STATES PATENT OFFICE.

HARRISON QUINBY, OF INDIANAPOLIS, INDIANA, ASSIGNOR TO WILLIAM H. McFARLAND, OF PITTSBURGH, PENNSYLVANIA.

TRACTOR.

Application filed May 3, 1922. Serial No. 558,172.

*To all whom it may concern:*

Be it known that I, HARRISON QUINBY, a citizen of the United States, and residing in the city of Indianapolis, in the county of Marion and State of Indiana, have invented or discovered new, useful, and Improved Tractors, of which the following is a specification.

My invention consists in certain new and useful improvements in tractors, relating especially to farm and garden tractors used in the cultivation of crops.

The objects which I have in view are, inter alia, as follows; to provide greater flexibility in the tractor so that the tools may be properly guided between the rows and around or over obstacles, and, further, that the course of the tractor may be more easily directed without necessarily removing the tools from the soil.

For the accomplishment of these purposes I attach the handle bars of the tractor to the latter in such a manner that they are individually movable in relation to their attachment on a horizontal axis, the said bars being flexibly connected together to permit said independent movement.

I also suspend the tool beam or support from the handle bars in such a manner that the said beam will swing in relation to said handle bars, so that by means of said handle bars the tools may be manipulated with great flexibility and accuracy.

Other novel and useful features of construction and arrangement of parts will appear from the following description.

In the accompanying drawings, which are, however, merely intended to illustrate a practical embodiment of the principles of my invention, without however limiting the scope of the latter to the construction shown, Fig. 1 is a side elevation showing the invention applied to a small tractor; Fig. 2 is an enlarged rear elevation showing the tool suspension; Fig. 3 is an enlarged detail showing the method of mounting a tool on the tool beam; Fig. 4 is a detail showing the method of attaching the center link to the tool beam, and Fig. 5 shows the method of attaching the side links to the tool beam.

The following is a detailed description of the drawings.

A represents the tractor frame having its front end supported on the traction wheel or wheels B and its rear end supported by the caster wheels C.

D and D' represent the two handle bars diverging rearwardly and having their front ends independently connected to the tractor frame by pivotal attachment or horizontal axes, as by means of the bolts 1.

The handle bars extend through vertically disposed guides 2 mounted on the frame, which limit the vertical movement of the bars and prevent lateral swinging of the same.

The handle bars are flexibly connected together near their rear ends by means of a spreader link E whose ends are pivoted to the short arms 3 integral with split collars 4 bolted tightly onto the handle bars. The rear ends of the bars D and D' are provided with the usual downwardly curved handles or grips 5.

F is an upwardly convexed yoke pivotally connected at its center to the link E, as by the bolt 6. To the ends of the yoke F are pivotally connected the upper ends of the depending side links 7 whose lower ends are pivotally connected on parallel axes to the tool beam G at points equally spaced from the center of the latter. I show the preferred manner of said connection in Fig. 5, the lower end of the link being flattened and pierced to receive a bolt 8 which also extends through a pierced bracket 9 attached to the tool beam. The links 7 are extensible, and for this purpose are preferably formed of an upper portion which is a rod while the lower portion is a piece of pipe into which the lower end of the rod is telescoped, a set screw 10 being used to hold the rod and pipe rigidly in their adjusted relation.

H is a central link whose upper end is rigidly connected to the spreader E, as by welding thereto, and whose lower end is pivotally connected to the center of the tool beam G.

In Fig. 4 I show the means for the attachment of the lower end of the center link to the tool beam. Thus 11 is a clevis fitting about the beam G and clamped tightly thereto by the wedge 12. The clevis is provided with a horizontally extending, threaded stud 13 which is inserted through a hole in the lower end of the link H and a washer and nut placed on the threaded outer end of said stud.

To prevent the tool beam dragging rearwardly from the handle bars I provide a V-shaped pulling rod J whose rounded apex extends through a collar bearing 14 attached to the underside of the tractor frame and whose diverging rear ends are rigidly connected, as by the bolt 15 to the tool beam.

The tools may be secured to the tool beam by means of clevises 16 encompassing said beam and having their upper and lower horizontal arms slotted to receive the stem of the tool K, a wedge 17 being driven down into said slots to wedge the tool and the beam rigidly together.

In the use of my invention, the tractor may be guided by manipulating the handles, which bear against the walls of the guides 2, and in said guidance the engagement of the tools with the soil furnishes a fulcrum which enables the tractor to be turned in any desired radius. The flexible connection between the handle bars greatly improves the control of the tractor. It is also perfectly evident that the tools are under complete control of the operator, the highest degree of flexibility being obtained, so that the tools may be guided with great nicety around obstacles and plants, and their degree of insertion into the soil controlled.

The flexibility furnished by my invention renders the tractor especially useful for garden and orchard cultivation, where frequent obstacles must be avoided, and also in farm crop cultivation where care must be observed to prevent injury to the crops.

What I desire to claim is:—

1. In combination with a tractor, a pair of rearwardly extending handle bars pivotally connected to said tractor to swing on horizontal axes, a spreader bar interposed between the handle bars, the ends of said spreader bar being flexibly connected to said handle bars, a yoke pivotally connected at its center to the center of said spreader bar, a tool support, and depending links swingingly connecting the ends of the yoke with said tool support.

2. In combination with a tractor, a pair of rearwardly extending handle bars pivotally connected to said tractor to swing on horizontal axes, a spreader bar interposed between the handle bars, the ends of said spreader bar being flexibly connected to said handle bars, a yoke pivotally connected at its center to the center of said spreader bar, a tool support, depending links swingingly connecting the ends of the yoke with said tool support, and a longitudinally disposed pull rod connecting said tool support with the tractor.

3. In combination with a tractor, a pair of rearwardly extending handle bars pivotally connected to said tractor to swing on horizontal axes, a spreader bar interposed between the handle bars, the ends of said spreader bar being flexibly connected to said handle bars, a yoke pivotally connected at its center to the center of said spreader bar, a tool support, depending links swingingly connecting the ends of the yoke with said tool support, and a third link rigidly depending from said spreader bar and pivotally connected to the center of said tool support.

4. In combination with a tractor, a pair of rearwardly extending handle bars pivotally connected to said tractor to swing on horizontal axes, a spreader bar interposed between the handle bars, the ends of said spreader bar being flexibly connected to said handle bars, a yoke pivotally connected at its center to the center of said spreader bar, a tool support, depending links swingingly connecting the ends of the yoke with said tool support, a third link rigidly connected to the center of said spreader bar and pivotally connected to the center of said tool support, and a longitudinally disposed pull rod flexibly connecting the tool support with said tractor.

5. In combination with a tractor, a pair of rearwardly extending handle bars, said bars being attached to the tractor in such a manner as to be pivoted independently of each other on horizontal axes, a horizontally disposed tool support, and links having their upper ends swingingly connected to said handle bars and their lower ends pivotally connected to said tool support at either side of the center of the latter.

6. In combination with a tractor, a pair of rearwardly extending handle bars, said bars being attached to the tractor in such a manner as to be pivoted independently of each other on horizontal axes, flexible connection between the rear ends of said handle bars whereby the range of their independent movements is limited, and a horizontally disposed tool support swingingly suspended at points on either side of its center from said handle bars.

Signed at Pittsburgh, Pa., this 29th day of April, 1922.

HARRISON QUINBY.